United States Patent [19]
Dane

[11] 3,812,936
[45] May 28, 1974

[54] SPRAG SOLENOID BRAKE
[75] Inventor: Dan H. Dane, Huntsville, Ala.
[73] Assignee: The United States of America as represented by the Administrator of the National Aeronautics and Space Administration, Washington, D.C.
[22] Filed: May 14, 1973
[21] Appl. No.: 359,958

[52] U.S. Cl. ............................ 188/171, 188/163
[51] Int. Cl. ..................... B60t 13/04, F16d 65/34
[58] Field of Search ........ 188/161, 163, 171, 82.77; 192/84 A, 84 B, 84 C

[56] References Cited
UNITED STATES PATENTS
| | | | |
|---|---|---|---|
| 3,198,293 | 8/1965 | Mathews | 188/163 |
| 3,224,540 | 12/1965 | Straub | 188/171 X |
| 3,263,778 | 8/1966 | Pfeiffer | 188/171 X |

Primary Examiner—Duane A. Reger
Attorney, Agent, or Firm—L. D. Wofford, Jr.; W. H. Riggins; J. R. Manning

[57] ABSTRACT

An electrically operated brake, including a housing having a cylindrical chamber provided therein. A rotary member is carried within the cylindrical chamber for rotation about a longitudinal axis of the cylindrical chamber. Circumferentially spaced sockets are disposed in the outer surface of the rotary member for accommodating one end of sprags. Spring means urge the sprags in contact with an inner surface of the housing for locking said rotary member relative to said housing. A control member is adapted to be shifted longitudinally by an electrically operated means for forcing the sprags out of engagement with the housing. A spring forces the control member to return to its braking position when the electrically operated means is de-energized.

6 Claims, 6 Drawing Figures

PATENTED MAY 28 1974　　　　　　　　　　　　　　　3,812,936

3,812,936

SPRAG SOLENOID BRAKE

ORIGIN OF INVENTION

The invention described herein was made by an employee of the United States Government, and may be manufactured and used by or for the Government for governmental purposes without the payment of any royalties thereon or therefor.

BACKGROUND OF THE INVENTION

This invention relates to an electrically operated brake, and more particularly to an electrically operated brake that has sprags carried therein, which are manipulated by a control member to either assume a braking position or free rotating position.

In manipulators, such as mechanical arms, which are remotely controlled, it has become important to provide some means for locking the manipulator in a rigid or fixed position so that other devices, such as tools, can be maneuvered relative thereto. For example, if the manipulator is a mechanical arm being used in outer space, it is often desired to hold an object in one arm while using another mechanical arm to control a tool for performing some function on the object. This requires the stationary mechanical arm to be locked in a fixed position.

Normally, these mechanical arms are controlled from a remote station, such as earth, by a simulated master control system including a pair of arms. When the master arms, which are generally strapped to an individual are moved, the slaved arms which may be located, for example on the moon or some other remote station, move accordingly. One problem encountered heretofore, is the operator becoming fatigued from the physical energy required for manipulating a particular arm and holding the other arm in a fixed position. It has become apparent that, if the slave, once it reaches a desired position, can be locked in that position, then the operator can move the master arm without affecting or changing the position of the slave arm. The mechanical arms generally include a rotating element that is driven by electric motors so that when it is desired to lock such in a fixed position it is necessary to lock the rotating element. This is accomplished by placing a braking device constructed in accordance with the present invention on the end of the rotating shaft so that when power is removed from the braking element it will lock the shaft in the position that it is in at that time. Of course, it is to be understood that the braking device constructed in accordance with the present invention may have many applications, and the use on a mechanical arm is just one particular illustration.

SUMMARY OF THE INVENTION

The invention comprises an electrically operated brake which includes a housing having a cylindrical chamber provided therein. A rotary member is carried within the cylindrical chamber for rotation about a longitudinal axis of the cylindrical chamber. Circumferentially spaced sockets are disposed in the outer surface of the rotary member, each receiving one end of a respective sprag. The other end of the respective sprag is adapted to engage an inner surface of the housing for providing braking. Spring means urge the sprags of respective pairs in opposite directions in the sockets for wedging engagement with the cylindrical housing. A control member is coaxially disposed on the rotary member, and is adapted to be shifted longitudinally by an electrically operated means for spreading the sprags out of wedging engagement with the inner surface of the cylindrical chamber when the electrically operated means is energized. Thus, the rotary member can be selectively placed in either a free rotating condition or a locked condition, depending upon the energization of the electrically operated means.

Accordingly, it is an important object of the present invention to provide a power-off brake having a large braking power for its size.

Another important object of the present invention is to provide an electrically operated braking device, which can be readily attached to a rotating element for either locking the rotating element in a fixed position, or for allowing such to rotate freely by merely applying electrical signals to the braking device.

Still another important object of the present invention is to provide a high energy solenoid brake.

These and other objects and advantages of the invention will become apparent upon reference to the following specification, attendant claims and drawing.

DESCRIPTION OF THE PREFERRED EMBODIMENT

Figure 1:
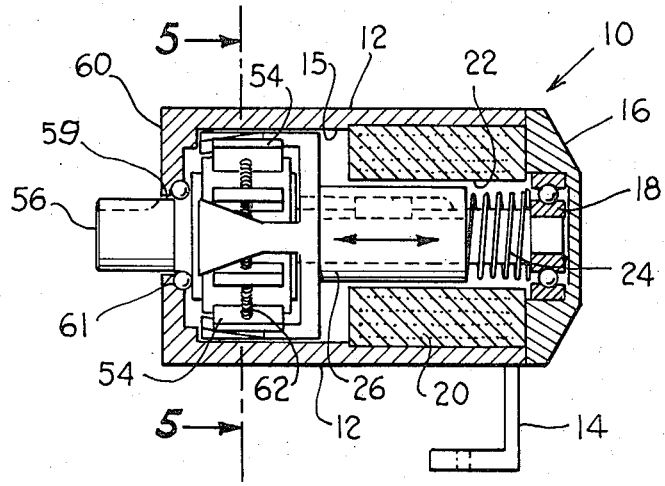
FIG. 1 illustrates a longitudinal cross-sectional view of a solenoid braking device constructed in accordance with the present invention.

Referring in more detail to FIG. 1 of the drawing, there is illustrated a braking device, generally designated by the reference character 10, constructed in accordance with the present invention. The braking device includes a cylindrical housing 12 which is fixed by a bracket 14 extending downwardly therefrom to any suitable structure so as to prevent rotation thereof. The housing 12 has a cylindrical chamber therein defined by an inner surface 15. Carried adjacent an outer end of the elongated cylindrical housing 12 is a cap 16 which is fixed to the outer housing 12 by any suitable means, such as bolts, not shown. The cap 16 has a bearing 18 centrally located therein. Positioned adjacent the cap 16 is a circular solenoid coil 20 which has an elongated axial bore 22 extending therethrough. A compression spring 24 is carried in the bore 22 of the coil 20, and has one end pressing against the bearing 18. The other end of the compression spring 24 presses against a control member 26.

Figure 2:
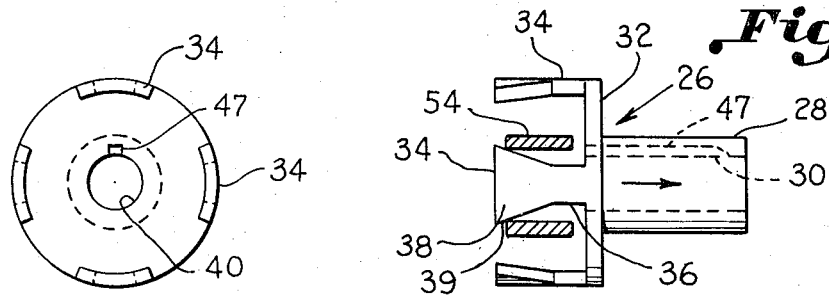
FIG. 2 is an enlarged elevation view of a control member forming part of the invention with a set of sprags shown in sections.
Figures 3, 4:
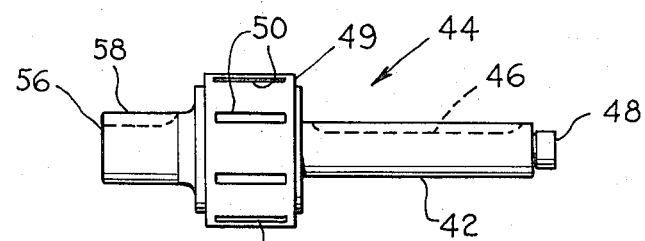
FIG. 3 is an elevation view looking from the left hand end of the control member shown in FIG. 2.
FIG. 4 is an enlarged side elevation view of a rotary member forming part of the subject braking device.

The control member 26 is shown in more detail in FIG. 2, and includes a circular elongated portion 28 which has a longitudinal bore 30 extending therethrough. The inner end of the elongated portion 28 is integral with an outwardly extending circular member 32 which has circumferentially spaced wedge shaped members 34 extending longitudinally therefrom. The wedge-shaped members 34 include a straight portion 36 which extends into the outwardly extending wedge 38. The wedge 38 is defined by opposed inclined surfaces 39 which diverge coaxially away from the longitudinal axis extending through the control member 26. In one particular embodiment, there are four wedge-shaped members 34 spaced circumferentially about the circular member 32. A hole 40 extends through the circular member 32 in alignment with the bore 30 extending through the elongated portion 28 for receiving the shank portion 42 of a rotary member, generally designated by the reference character 44. The shank portion 42 has an elongated key slot 46 provided in the surface thereof so that the shank portion 42 can be inserted into the bore 30 of the control member 26 and keyed thereto by a key 47. It is to be understood, however, that sufficient tolerance is permitted between the key 47 and the key slot 46 to permit the control member 26 to be readily shifted longitudinally. An inner end 48 of the shank portion 42 is reduced for being positioned within the bearing 18 carried in the cap member 16.

Adjacent the center of the control shaft 44 is an enlarged circular member 49 which has elongated longitudinal slots 50 spaced circumferentially therearound. These slots 50 are provided for receiving an inner end of a sprag 54. The other end 56 of the driven shaft 44 has a key slot 58 provided therein so that such can be coupled to any suitable shaft that it is desired to apply a braking action thereto. The end 56 of the driven shaft 44 extends through a hole 59 provided in an end 60 of the housing 12. Bearings 61 are carried within the housing 12 for supporting the end 56 of the driven shaft 44. It is noted from observing FIG. 1 that a certain amount of clearance is provided between the solenoid coil 20 and the control member 26 when such is located within the housing 12 so that the control member 12 can be shifted back and forth about its longitudinal axis within the housing 12. As shown in FIG. 1, the control member 26 is shifted to the left by the spring 24.

Figure 5:
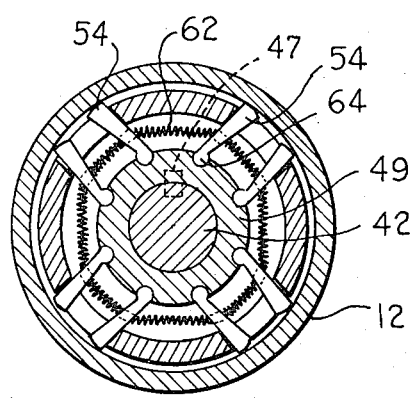
FIG. 5 is a cross-sectional view taken along line 5—5 of FIG. 1.

Referring to FIGS. 1 and 5 of the drawings, sprags 54 are positioned on opposite sides of the wedges 38 and a spring 62 tends to pull the sprags of respective pairs together adjacent the inclined surfaces 39 of the wedge member 34. As previously mentioned, the inner rounded ends 64 of the sprags are carried within the longitudinal slots 50 provided in the circular member 49. The outer surface of the sprags are inclined so that, for example, the sprag member illustrated at the top left in FIG. 5 when engaging the inner wall of the outer housing 12 will prevent the drive shaft 44 from rotating in a counter-clockwise direction. The sprag 54 shown at the top right when engaging the outer housing 12 will prevent the drive shaft 44 from rotating in a clockwise direction. Therefore, when both of the sprags 54 of a particular pair engage the inner surface of the outer housing 12, such lock the drive shaft 44 preventing it from rotating in either direction. In order to disengage the outer surfaces of the sprags 54 from the outer housing 12 the solenoid coil 20 is energized by any suitable source of power, shifting the control member 26 to the right when viewing the device in FIG. 1. This causes, as shown in FIG. 2, the sprag elements 54 to ride up the inclined surfaces 39 of the wedge-shaped members 38 pulling such out of contact with the outer housing 12. When the sprags 54 are pulled out of contact with the outer housing 12 the drive shaft 44 is permitted to rotate freely. Upon de-energizing the solenoid coil 20 the spring 24 forces the control member back to the left and the spring 62 coupled between cooperating sprag members pulls the sprag members 54 towards each other into engagement with the outer housing 12 to prevent shaft 44 from rotating relative to the outer housing. The spring 62 is connected to the sprags in a conventional manner, wherein, it tends to pull the sprags of respective pairs together.

Since the control member 26 is keyed to the drive shaft 42 by a key 47, the control member rotates with the drive shaft 42. However, it is to be understood that the control member 26 is permitted to shift longitudinally along the drive shaft 42 by either energizing the solenoid coil 20 or by allowing the spring 24 to push such in the opposite direction when the coil is de-energized.

In summarizing the operation of the brake shown in FIGS. 1 through 5, when the solenoid coil 20 is de-energized the spring 24 forces the control member to the left. In this position the spring 62, which engages the sprags, pull the sprags of respective pairs of sprags together wedging the outer ends of the sprags against the inner wall 15 of the housing 12. This causes the drive shaft 44 to be locked relative to the outer housing 12. When it is desired to permit the drive shaft 44 to rotate freely relative to the outer housing 12 the solenoid coil 20 is energized causing the control member to shift to the right. As the control member shifts to the right the sprags 54 ride up the inclined surfaces 39 of the wedges 38 forcing the sprags out of engagement with the inner wall 15 of the housing 12.

Figure 6:
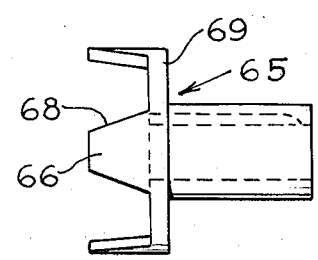
FIG. 6 is a side elevational view illustrating an alternate control member constructed to provide braking when power is applied to a solenoid forming part of the brake.

FIG. 6 illustrates a modified control member 65 which is constructed in the same manner as the control member 26 with the exception that the wedge-shaped member 66 has surfaces 68 which diverge towards the longitudinal axis away from the circular member 69. As a result of the inclined surfaces diverging when the solenoid coil 20 is de-energized the spring 24 forces the control member to the left spreading the sprags 54 out of engagement with the inner wall 15 of the housing 12 permitting the drive shaft 44 to rotate freely relative to the outer housing 12. Upon energizing the solenoid coil the control member 65 is shifted to the right permitting the spring 62 to pull the sprags 54 into wedging contact with the outer housing 12 locking the control shaft 42 relative to the outer housing. Therefore, when the solenoid coil is de-energized the control shaft 44 is permitted to rotate freely and upon energizing the solenoid coil 20 such is placed in a locked condition.

What is claimed is:

1. An electrically operated brake comprising:
   a. a housing having a cylindrical chamber provided therein defined by an inner surface,
   b. a rotary member carried within said cylindrical chamber for rotation about a longitudinal axis of said cylindrical chamber;
   c. circumferentially spaced sockets disposed in an outer surface of said rotary member;
   d. at least one pair of sprags each having a rounded end portion and an opposite wedging end portion;
   e. said end portions being respectively disposed in said sockets of said surface of said rotary member and in engagement with said inner surface of said cylindrical chamber;
f. spring means urging the sprags of each pair in opposite directions in the sockets thereof for wedging engagement with said inner surface of said cylindrical chamber;
g. a control member coaxially disposed on said rotary member;
h. means coupling said control member to said rotary member for rotation therewith while permitting said control member to be shifted longitudinally thereto,
i. electrically operated means for urging said control member to a first longitudinal position on said rotary member when energized;
j. means for urging said control member to a second longitudinal position on said rotary member when said electrically operated means is de-energized;
k. inclined means carried adjacent one end of said control member for permitting said spring means to force said sprags into wedging engagement with said inner surface of said housing when said control member in in one of said longitudinal positions and for spreading said sprags out of wedging engagement with said inner surface when said control member is in the other longitudinal position;
whereby said rotary member can be maintained in a fixed or freely rotating position relative to said housing.

2. The brake as set forth in claim 1 wherein said means for urging said control member to said second longitudinal position is a spring.

3. The brake as set forth in claim 1 wherein, said inclined means includes:
a. a wedge-shaped member having a pair of opposed inclined surfaces which engage respective sprags of a pair for spreading said sprags apart out of contact with said inner surface of said housing when said control member is in said first position.

4. The electrically operated brake as set forth in claim 1, wherein said electrically operated means includes:
a. a cylindrical coil having a bore extending therethrough; and
b. said control member and said rotary member being coaxially disposed in said bore of said coil; whereby when said coil is energized said control member shifts longitudinally in said bore to said first position.

5. The electrically operated brake as set forth in claim 3 wherein said inclined surfaces of said wedge-shaped member converge towards said longitudinal axis and said one end of said control member.

6. The electrically operated brake as set forth in claim 3 wherein said inclined surfaces of said wedge-shaped member diverge away from said longitudinal axis towards one end of said control member.

* * * * *